May 16, 1944.  K. MAUCH ET AL  2,348,832
PROCESS FOR TREATING BITUMINOUS SUBSTANCES
Filed April 3, 1939
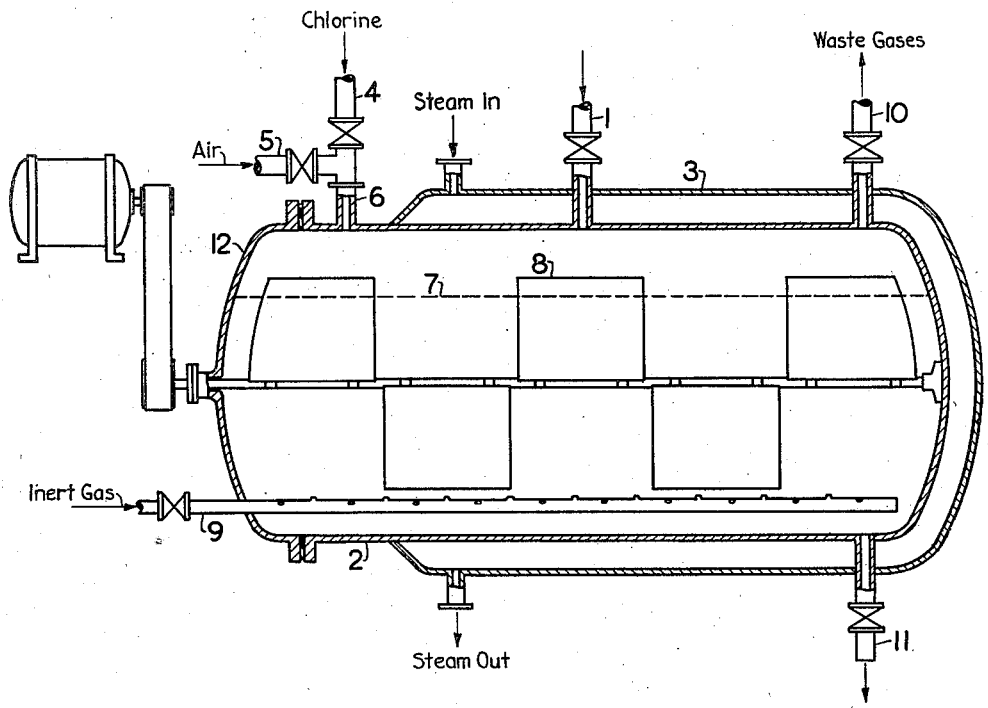
Inventors: Karl Mauch
Othmar Pauer
By their Attorney:

Patented May 16, 1944

2,348,832

UNITED STATES PATENT OFFICE 2,348,832

PROCESS FOR TREATING BITUMINOUS SUBSTANCES

Karl Mauch and Othmar Pauer, Hamburg, Germany; vested in the Alien Property Custodian Application April 3, 1939, Serial No. 265,863
In Germany April 19, 1938

5 Claims. (Cl. 106—273)

This invention relates to bituminous substances and is more particularly concerned with an improved method of treating bituminous substances with a dehydrogenating gas, such as chlorine.

It is a purpose of this invention to produce a bituminous substance with exceptionally low temperature susceptibility. Another object of the invention is to decrease the temperature susceptibility of bituminous substances without materially affecting the Fraass breaking point. It is still another object to improve the uniformity of the reaction between the bituminous substance treated and the dehydrogenating gas so that a more uniform product results. It is a further purpose to produce from bitumen a useful product having rubber-like properties.

It is known that blowing bitumen, such as a petroleum residuum, with air, steam, etc., has the effect of lowering the susceptibility to temperature. However, many blown asphalts and especially those that have been blown sufficiently to materially decrease their temperature susceptibility are known in general to be relatively brittle. It is further known that the addition of a small amount of a halogen in the gaseous state to the air being blown through bituminous substance may have the effect of producing a bituminous substance possessing lower temperature susceptibility and being less brittle than a bitumen treated with air alone. However, in the known methods of treating with a halogen such as suggested in U. S. Patents 2,059,051 and 1,979,677 disclosing blowing chlorine and air through a perforated pipe placed in the base of a cylindrical still containing the bituminous material to be treated, only relatively small amounts of chlorine may be used to advantage. Under the conditions of these patented processes, the dehydrogenating gas, e. g., chlorine, seems to pass through the viscous bitumen in the same channels for relatively long periods thereby causing local over-reaction and formation of carbenes without forming sufficient amounts of resins and asphaltenes necessary in asphalt compositions which are properly balanced, so that they will not separate on standing. To prevent this local over-reaction of the bitumen, comparatively small amounts only of chlorine have been allowed to react in the known processes. Although such treatments may give products superior to air blown asphalts, they are incapable of improving the temperature susceptibility and other properties of asphalts to an extent possible by the method of our invention without causing harm to other properties.

In accordance with our invention we pass a dehydrogenating gas, e. g., chlorine, through the space above the surface of the bitumen, preferably at an elevated temperature while mechanically agitating said bitumen. By this method of treating the dehydrogenating gas continuously comes in contact with newly exposed surfaces, and a surface once formed stays in contact for a very short period only. In this manner over-reaction is positively reduced to a minimum. The bituminous products of our method are quite homogenous and do not separate on standing even when quantities of chlorine or other dehydrogenating gas have been used, sufficient to reduce an infusible bitumen.

In carrying out our invention we may employ any gas having dehydrogenating powers greater than air such as chlorine, bromine, iodine, sulfur dioxide and the like. The dehydrogenating gas may be diluted with an inert gas or one having lower dehydrogenating power such as air, carbon dioxide, nitrogen, etc., for the purpose of controlling the reaction and for preventing its becoming too violent. The degree of dilution may vary with the temperature of treatment, substance treated, and the nature of the desired product and may be ascertained by preliminary tests. The dehydrogenatin gas may be used in amounts ranging from 10 to 30% by weight of the bitumen treated, and should be introduced into the reaction space slowly over a relatively long period of time, e. g., of about ½ to 5 hours. The exact amount of such gas employed depends upon the characteristics desired of the product. Although the process is especially advantageous when treating with large amounts of a dehydrogenating gas to produce bitumen of exceptionally low temperature susceptibility without causing harm to certain other properties, the uniformity of the reaction and resulting product will make it equally useful when treating with relatively small quantities of said gases, i. e., less than 10% by weight of the bitumen.

About 10% of the dehydrogenating gas may combine with the bitumen, the remainder being converted to HCl, HBr, H₂S, etc., as the case may be. Some of the gaseous reaction products may be retained by the treated bitumen and may if desired be removed by maintaining said treated bitumen at a temperature of about 200° C. while stirring and passing an inert gas such as carbon dioxide, nitrogen, or the like, through the bitumen.

The mechanical agitation of our process is accomplished by stirring with stirrers, paddles, circulating pumps, or by kneading or means other than bubbling the reacting gas or gases through the bitumen being treated.

The bitumen subjected to our treatment may be a topped mineral oil, natural asphalt, still residuum asphalt, naphthenic extract from lubricating stock, or other bituminous substance. We prefer to carry our treatment in the absence of solvents for bitumens such as carbon tetrachloride, carbon disulfide, benzene, pyridine, etc., because of the danger of forming undesirable substitution products including highly chlorinated or otherwise reacted products of the solvent itself.

The temperature of the reaction is advantageously between about 175° C. and 275° C. and preferably between 200° to 230° C. At relatively low temperatures the reaction may proceed too slowly and incompletely, and if temperatures become too high the bitumen may decompose.

The reactions which take place in the presence of the dehydrogenating gas are believed to be primarily dehydrogenation and condensation reactions analogous to the Friedel and Crafts reaction and to a very minor extent only reactions involving additions or substitutions of the dehydrogenating gas. The final product may be semi-liquid, plastic or resembling rubber, depending upon the amount of dehydrogenating gas used in the reaction. The formation of non-fusible, elastic, rubber-like products, which occurs when using relatively large amounts of dehydrogenating gas is evidence that a simultaneous polymerization and condensation may take place.

The products prepared according to our process may, because of their exceptionally low temperature susceptibilities be used especially for insulating purposes in places calling for severe requirements due to large variations in temperature. The similarity of infusible reaction products to crude rubber make their use as a partial or complete substitute for rubber appear possible in many cases. Typical rubber-like products usually contain less than 3½% chlorine and usually between 1½ and 3% chlorine. Such products may and usually do have Fraass breaking points of −25° C. or below if produced from bitumens originally having breaking points that low or lower.

The invention may be more fully understood by referring to the drawing which represents an apparatus suitable for our treatment.

The bitumen to be treated is introduced, if desired after preheating, through line 1 into the cylindrical still 2, until the desired level 7 is reached. The bitumen is maintained at an elevated temperature, preferably at about 220° C. by passing super-heated steam or some other heating medium through the heating jacket 3. When the desired temperature has been reached the bitumen is treated with a suitable amount, e. g., about 10 to 30% of chlorine. The chlorine is metered into line 4 and may be diluted with air from line 5. The resulting gaseous mixture is then slowly passed through line 6 into the space above the surface of the bitumen. The bitumen while being treated with said gaseous mixture is constantly agitated by means of stirrers 8. When the introduction of the chlorine is substantially completed an inert gas may be blown through the perforated pipe 9 to remove any volatile reaction products, such as HCl, which are vented through line 10. The reacted bituminous product if in a flowable condition may be withdrawn through bottom line 11, or if incapable of flowing, through detachable still head 12.

The following examples further illustrate our invention.

The softening points as reported in these examples were determined by the A. S. T. M. ring and ball method. All penetration measurements were made at 25° C. according to the A. S. T. M. method with a 100 gram load. The breaking points were determined by the Fraass D. I. M. method (German bureau of standards), and dropping points by the Ubbelohde method. The temperature difference between the breaking point and softening point of the bitumen is a measure of its useful temperature range, the breaking point giving the temperature of excessive brittleness and the softening point being a measure of the melting temperature.

*Example I*

100 kg. of petroleum bitumen of 27° C. softening point, having a penetration above 800 and a Fraass breaking point of below −25° C. was treated at 220° C. with a bromine vapor-air mixture, while vigorously stirring. 13.71 kg. of bromine were introduced over a period of 110 minutes. The bromine content of the reaction product amounted to 1.75%, 11.96 kg. of bromine having been converted to HBr. The penetration of the treated bitumen amounted to 30. Its softening point was now 118° C., the dropping point 138° C.; the Fraass breaking point remained below −26° C. which means the bitumen that once softened at 27° C. now had a useful range between −26° C. and 118° C. without being brittle or soft.

*Example II*

100 kg. of petroleum bitumen of 27° C. softening point, penetration about 800 and Fraass breaking point of below −25° C. was treated at 220° C. with a chlorine-air mixture while vigorously stirring. 16.76 kg. of chlorine were introduced over a period of 120 minutes. The chlorine content of the reaction product amounted to 1.72%, 15.04 kg. of chlorine having been converted to HCl. The penetration amounted to 16; the softening point of the bitumen was now 160° C.; the dropping point about 180° C., and the breaking point, Fraass method, was still −25° C. which meant the product could be used up to 160° C. without softening, and down to −25° C. without becoming excessively brittle.

*Example III*

100 kg. of topped asphaltic crude oil having a viscosity of 10.2° Engler at 100° C. was treated at about 220° C. with a chlorine-air mixture, while vigorously stirring. 24.80 kg. of chlorine were introduced over a period of 170 minutes. The chlorine content of the reaction product amounted to 1.96%, 22.84 kg. of chlorine having been converted to HCl. The bituminous product obtained was rubbery and could no longer be evaluated by the usual testing methods for bitumens. It was no longer fusible and had to be kneaded into the testing devices. The softening point was higher than 165° C., the Fraass breaking point was lower than −27° C.

*Example IV*

100 kg. of a topped sulfur dioxide extract of a heavy machine oil, having a viscosity of about 3° Engler at 100° C. was treated at about 220° C.

with a chlorine-air mixture, with vigorous agitation. Chlorination was continued until the chlorine content of the bituminous product of the reaction amounted to about 3%. The product obtained was no longer fusible; the softening point as well as the dropping point could not be determined. The once fluid extract had become plastic. The Fraass breaking point was lower than $-27°$ C.; the apparent penetration at $25°$ C. was about 41.

We claim as our invention:

1. A method of reducing the temperature susceptibility of an unoxidized bituminous substance comprising contacting said bituminous substance with at least 10% of its weight of a dehydrogenating gas having a dehydrogenating power greater than air, said contacting consisting solely in passing said dehydrogenating gas slowly for at least one-half hour in contact with the upper surface only of said bituminous substance maintained at a temperature of about $200°$ C. to $230°$ C., in the absence of a solvent capable of dissolving said bituminous substance and of reacting with said gas, while mechanically agitating said bituminous substance so as to expose a changing surface to said gas without incorporating any gas into the body of said bituminous substance.

2. A method of reducing the temperature susceptibility of an unoxidized bitumen comprising contacting said bitumen with air and at least 10% of its weight of a dehydrogenating gas having greater dehydrogenating power than air, said contacting consisting solely of passing said dehydrogenating gas slowly for at least one-half hour in contact with the upper surface only of said bitumen maintained at a temperature of about $200°$ C. to $230°$ C., in the absence of a solvent capable of dissolving said bituminous substance and of reacting with said gas, while mechanically agitating said bitumen so as to expose a changing surface to said gas without incorporating any gas into the body of said bitumen.

3. The process of claim 1 wherein the dehydrogenating gas is chlorine.

4. A method of reducing the temperature susceptibility of an unoxidized bituminous substance comprising contacting said bituminous substance with 10% to 30% of its weight of chlorine, said contacting consisting solely in passing said chlorine slowly for at least one-half hour in contact with the upper surface only of said bituminous substance maintained at a temperature of about $200°$ C. to $230°$ C. in the absence of a solvent capable of dissolving said bituminous substance and of reacting with chlorine while mechanically agitating said bituminous substance so as to expose a changing surface to said gas without incorporating any chlorine into the body of said bituminous substance.

5. An infusible elastic rubber-like chlorinated asphalt, containing between one and one-half and three per cent of chlorine and having a Fraass breaking point of not higher than $-25°$ C. and being produced by the method stated in claim 4.

KARL MAUCH.
OTHMAR PAUER.